US009064454B2

(12) United States Patent
Han et al.

(10) Patent No.: US 9,064,454 B2
(45) Date of Patent: Jun. 23, 2015

(54) DISPLAY DEVICE AND METHOD OF DRIVING THE SAME

(75) Inventors: Sang-Myeon Han, Seoul (KR); Jae-Beom Choi, Suwon-si (KR); Bong-Ju Kim, Suwon-si (KR); Kwon-Hyung Lee, Seoul (KR); Ji-Hye Eom, Suwon-si (KR); Sang-Hyun Jun, Suwon-si (KR); Hyun-Been Hwang, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 986 days.

(21) Appl. No.: 12/435,103

(22) Filed: May 4, 2009

(65) Prior Publication Data

US 2010/0134461 A1 Jun. 3, 2010

(30) Foreign Application Priority Data

Dec. 2, 2008 (KR) ........................ 10-2008-0121288

(51) Int. Cl.
*G06F 3/038* (2013.01)
*G09G 3/32* (2006.01)

(52) U.S. Cl.
CPC ...... *G09G 3/3233* (2013.01); *G09G 2300/0819* (2013.01); *G09G 2300/0852* (2013.01); *G09G 2300/0861* (2013.01); *G09G 2320/0223* (2013.01); *G09G 2320/043* (2013.01)

(58) Field of Classification Search
CPC ........................................................ G06F 3/038
See application file for complete search history.

(56) References Cited

U.S. PATENT DOCUMENTS

| | | | | |
|---|---|---|---|---|
| 7,688,292 | B2 * | 3/2010 | Park et al. | 345/82 |
| 7,692,191 | B2 * | 4/2010 | Kwak et al. | 257/59 |
| 7,710,368 | B2 * | 5/2010 | Chung | 345/82 |
| 7,956,825 | B2 * | 6/2011 | Kane | 345/76 |
| 8,040,303 | B2 * | 10/2011 | Kim et al. | 345/82 |
| 8,054,250 | B2 * | 11/2011 | Kim | 345/76 |
| 2004/0056604 | A1 * | 3/2004 | Shih et al. | 315/169.2 |
| 2008/0158205 | A1 * | 7/2008 | Park et al. | 345/204 |
| 2009/0207158 | A1 * | 8/2009 | Park et al. | 345/211 |

FOREIGN PATENT DOCUMENTS

| | | |
|---|---|---|
| JP | 2004-094237 | 3/2004 |
| JP | 2004-287046 | 10/2004 |
| JP | 2005-055722 | 3/2005 |
| JP | 2006-285116 | 10/2006 |
| JP | 2007-316356 | 12/2007 |
| JP | 2008-083085 | 4/2008 |

(Continued)

*Primary Examiner* — Claire X Pappas
*Assistant Examiner* — James M Holland
(74) *Attorney, Agent, or Firm* — F. Chau & Associates, LLC

(57) ABSTRACT

A display device and a method of driving the same, in which the display device includes: a light-emitting element; a first capacitor connected between first and second contact points; a driving transistor that has a control terminal connected to the second contact point, an input terminal connected to a driving voltage, and an output terminal connected to the light-emitting element; a first switching transistor connected between a data voltage or a sustain voltage and the first contact point; a second switching transistor connected between the second contact point and the output terminal of the driving transistor; and a third switching transistor connected between a reference current source and the output terminal of the driving transistor.

11 Claims, 23 Drawing Sheets

(56) References Cited

FOREIGN PATENT DOCUMENTS

| | | | |
|---|---|---|---|
| KR | 1020020095351 | A | 12/2002 |
| KR | 1020040100939 | | 12/2004 |
| KR | 1020060078427 | A | 7/2006 |
| KR | 100655778 | B1 | 12/2006 |
| KR | 100674107 | B | 1/2007 |
| KR | 1020080000470 | A | 1/2008 |
| KR | 1020100134125 | | 12/2010 |

* cited by examiner

DISPLAY DEVICE AND METHOD OF DRIVING THE SAME

CROSS-REFERENCE TO RELATED APPLICATION

This application claims priority to and the benefit of Korean Patent Application No. 10-2008-0121288 filed in the Korean Intellectual Property Office on Dec. 2, 2008, the entire contents of which are incorporated herein by reference.

BACKGROUND (a) Technical Field

The present disclosure relates to a display device and a method of driving the same. More particularly, the present disclosure relates to an organic light emitting device and a method of driving the same.

(b) Discussion of Related Art

A pixel of an organic light emitting device includes an organic light emitting element, along with a thin film transistor (TFT) and a capacitor that drive the light emitting element.

The TFT is classified as a polysilicon TFT or an amorphous silicon TFT, according to the kind of active layer.

Because amorphous silicon is deposited at a low temperature and forms a thin film, the amorphous silicon is generally used for a semiconductor layer of a switching element of a display device that mainly uses glass having a low melting point as a substrate. The amorphous silicon TFT, however, has a difficulty in providing large increases in a display area of a display element due to low electron mobility. Furthermore, because the amorphous silicon TFT continuously applies a DC voltage to a control terminal, a threshold voltage is varied, whereby the amorphous silicon TFT may be degraded. This becomes a major factor that shortens the lifetime of the organic light emitting device.

Therefore, application of a polysilicon TFT that has high electron mobility, good high-frequency operation characteristics, and a low leakage current is desirable. In a process of forming an active layer with polysilicon, however, due to characteristics of a semiconductor that is included in the TFT, it is not easy to uniformly form the polysilicon TFT within the display device. Therefore, a deviation occurs in a threshold voltage and electric field effect mobility of the driving transistors and, thus, screen uniformity is deteriorated.

Furthermore, because a sequential degradation phenomenon may occur in a polysilicon TFT, deviations may sequentially occur in a threshold voltage and electric field effect mobility of driving transistors and, thus, a luminance deviation may occur between pixels.

The above information disclosed in this Background section is only for enhancement of understanding of the background of the invention and, therefore, it may contain information that does not form the prior art that is already known in this country to a person of ordinary skill in the art.

SUMMARY OF THE INVENTION

Exemplary embodiments of the present invention have been made to provide a display device and a method of driving the same having advantages of improving non-uniformity in luminance of pixels, even if threshold voltages and electric field effect mobility of the driving transistors of the pixels are not uniform in an organic light emitting device, or even if a threshold voltage and electric field effect mobility of a driving transistor are sequentially changed.

An exemplary embodiment of the present invention provides a display device including: a light-emitting element; a first capacitor connected between first and second contact points; a driving transistor that has a control terminal connected to the second contact point, an input terminal connected to a driving voltage, and an output terminal connected to the light-emitting element; a first switching transistor connected between a data voltage or a sustain voltage and the first contact point; a second switching transistor connected between the second contact point and the output terminal of the driving transistor; and a third switching transistor connected between a reference current source and the output terminal of the driving transistor.

The display device may further include a second capacitor connected between the first contact point and the driving voltage.

The second and third switching transistors may be controlled by a first scanning signal, and the first switching transistor nay be controlled by a second scanning signal.

The first, second, and third switching transistors may be p-channel electric field effect transistors.

The display device may further include a fourth switching transistor connected between the first contact point and the driving voltage.

The first second, and third switching transistors may be controlled by a first scanning signal, and the fourth switching transistor may be controlled by a second scanning signal.

The first to fourth switching transistors may be p-channel electric field effect transistors.

The display device may further include a fourth switching transistor connected between the first contact point and the sustain voltage.

The first, second, and third switching transistors may be p-channel electric field effect transistors, and the fourth switching transistor may be an n-channel electric field effect transistor.

The second and third switching transistors may be controlled by a first scanning signal, and the first and fourth switching transistors may be controlled by a second scanning signal.

The display device may further include a second capacitor connected between the first contact point and the sustain voltage.

The second, third, and fourth switching transistors may be controlled by a first scanning signal and the first switching transistor may be controlled by a second scanning signal.

The first to fourth switching transistors may be p-channel electric field effect transistors.

The display device may further include a fourth switching transistor connected between the first contact point and the driving voltage.

The first, second, and third switching transistors may be p-channel electric field effect transistors, and the fourth switching transistor may be an n-channel electric field effect transistor.

The first to fourth switching transistors may be controlled by the same scanning signal.

The driving transistor may be a p-channel electric field effect transistor.

The driving transistor may include polysilicon.

An exemplary embodiment of the present invention provides a method of driving a display device including a light-emitting element, a capacitor connected between first and second contact points, and a driving transistor that has a control terminal connected to the second contact point, an input terminal connected to a driving voltage, and an output terminal connected to the light-emitting element, the method including: connecting the control terminal and the output terminal of the driving transistor; connecting the output terminal of the driving transistor and a reference current source; connecting the first contact point and a sustain voltage; and disconnecting a connection between the control terminal and the output terminal of the driving transistor, disconnecting a connection between the output terminal of the driving transistor and the reference current source, disconnecting a connection between the first contact point and the sustain voltage, and connecting the first contact point and a data voltage.

The method may further include disconnecting a connection between the first contact point and the data voltage after the connecting of the first contact point and the data voltage.

At the disconnecting of a connection between the first contact point and the data voltage, the capacitor may be connected to a constant voltage.

An exemplary embodiment of the present invention provides a method of driving a display device including a light-emitting element, a capacitor connected between first and second contact points, and a driving transistor that has a control terminal connected to the second contact point, an input terminal connected to a driving voltage, and an output terminal connected to the light-emitting element, the method including: connecting the control terminal and the output terminal of the driving transistor; connecting the output terminal of the driving transistor and a reference current source; connecting the first contact point and a data voltage; and disconnecting a connection between the control terminal and the output terminal of the driving transistor, disconnecting a connection between the output terminal of the driving transistor and the reference current source, disconnecting a connection between the first contact point and the data voltage, and connecting the first contact point and the driving voltage.

The method may further include disconnecting a connection between the first contact point and the driving voltage after the connecting of the first contact point and the driving voltage.

At the disconnecting of a connection between the first contact point and the driving voltage, the capacitor may be connected to a constant voltage.

According to exemplary embodiments of the present invention, even if threshold voltages of driving transistors of pixels are not uniform, the luminance of the pixels can be uniform. Furthermore, even if a threshold voltage of a driving transistor is degraded, the luminance of the organic light emitting element can be uniformly improved.

DETAILED DESCRIPTION OF EXEMPLARY EMBODIMENTS

Exemplary embodiments of the present invention will be described more fully hereinafter with reference to the accompanying drawings, in which exemplary embodiments of the present invention are shown. As those of ordinary skill in the art would realize, the described exemplary embodiments may be modified in various different ways, all without departing from the spirit or scope of the present invention.

First, an organic light emitting device according to an exemplary embodiment of the present invention will be described with reference to FIGS. 1 and 2.

Figure 1:
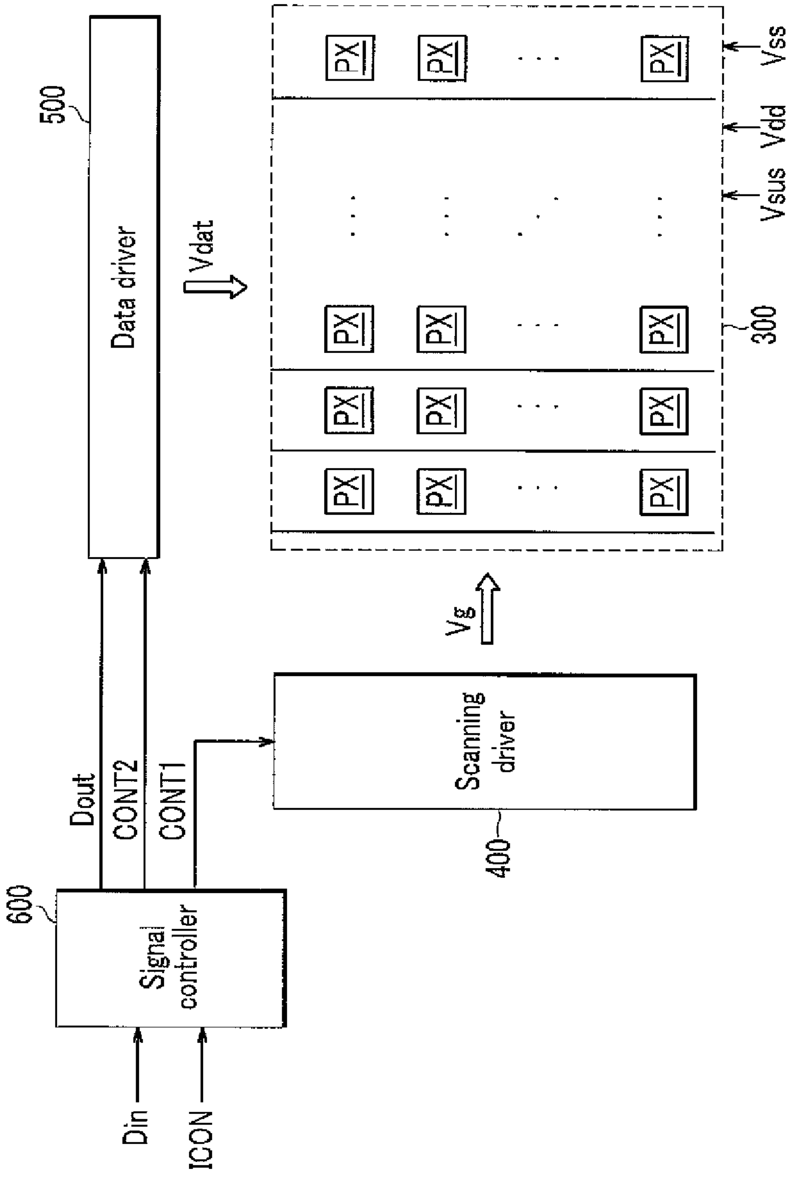
FIG. 1 is a block diagram of an organic light emitting device according to an exemplary embodiment of the present invention.
Figure 2:
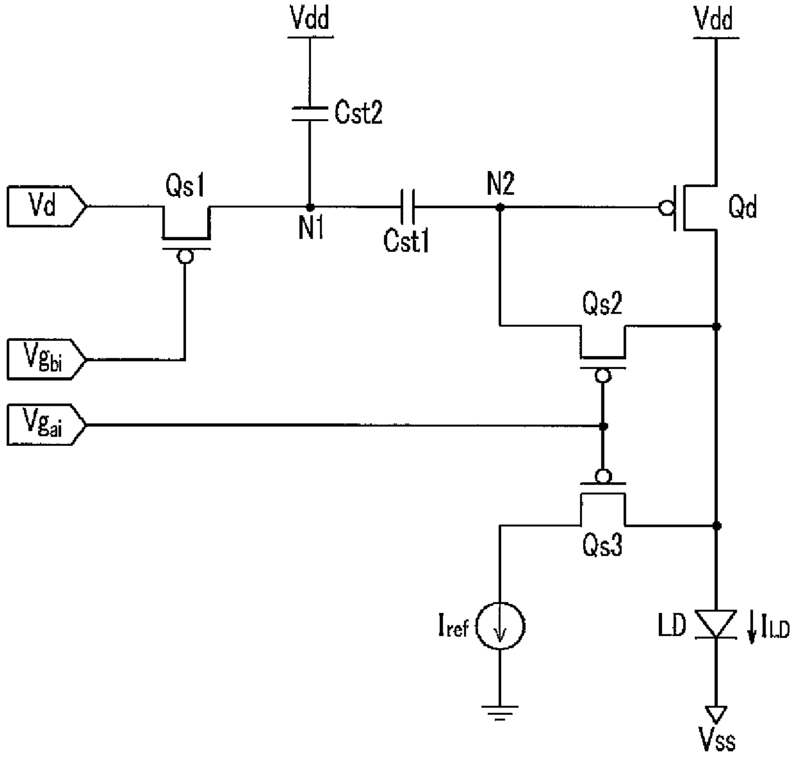
FIG. 2 is an equivalent circuit diagram of one pixel in an organic light emitting device according to an exemplary embodiment of the present invention.

FIG. 1 is a block diagram of an organic light emitting device according to an exemplary embodiment of the present invention, and FIG. 2 is an equivalent circuit diagram of one pixel in an organic light emitting device according to an exemplary embodiment of the present invention.

Referring to FIG. 1, the organic light emitting device includes a display panel 300, a scanning driver 400, a data driver 500, and a signal controller 600.

The display panel 300 includes a plurality of signal lines (not shown), a plurality of voltage lines (not shown), and a plurality of pixels PX that are connected thereto and arranged in approximately a matrix form.

The signal lines include a plurality of scanning signal lines (not shown) that transfer a scanning signal and a plurality of data lines (not shown) that transfer a data signal. The scanning signal lines extend in approximately a row direction and are substantially parallel to each other, and the data lines extend in approximately a column direction and are substantially parallel to each other.

The voltage lines include driving voltage lines (not shown) that transfer a driving voltage and sustain voltage lines (not shown) that transfer a sustain voltage.

As shown in FIG. 2, each pixel PX includes an organic light emitting element LD, a driving transistor Qd, a first capacitor Cst1, a second capacitor Cst2, and first, second, and third switching transistors Qs1, Qs2, and Qs3.

The driving transistor Qd has an output terminal, an input terminal, and a control terminal. The control terminal of the driving transistor Qd is connected to the first capacitor Cst1 at a contact point N2, the input terminal thereof is connected to a driving voltage Vdd, and the output terminal thereof is connected to the second and third switching transistors Qs2 and Qs3.

One end of the first capacitor Cst1 is connected to the driving transistor Qd at the contact point N2, and the other end thereof is connected to the first switching transistor Qs1 and the second capacitor Cst2 at a contact point N1.

One end of the second capacitor Cst2 is connected to the first capacitor Cst1 and the first switching transistor Qs1 at the contact point N1, and the other end thereof is connected to the driving voltage Vdd.

The first switching transistor Qs1 operates in response to a second scanning signal Vgbi and is connected between the contact point N1 and an input voltage Vd.

The second switching transistor Qs2 operates in response to a first scanning signal Vgai and is connected between the contact point N2 and the output terminal of the driving transistor Qd.

The third switching transistor Qs3 operates in response to the first scanning signal Vgai and is connected between a reference current source Iref and the output terminal of the driving transistor Qd.

The three switching transistors Qs1-Qs3 and the driving transistor Qd are p-channel electric field effect transistors. The electric field effect transistor comprises, for example a TFT, and it may include polysilicon or amorphous silicon. Channel types of the three switching transistors Qs1-Q3 and the driving transistor Qd may be reversed. In this case, waveforms of signals for driving them should also be reversed or inverted.

An anode and a cathode of the organic light emitting element LD are connected to the output terminal of the driving transistor Qd and a common voltage Vss, respectively. The organic light emitting element LD emits light with different intensities according to the magnitude of a current $I_{LD}$ that is supplied by the driving transistor Qd, and the magnitude of the current $I_{LD}$ depends on a magnitude of a voltage between the control terminal and the output terminal of the driving transistor Qd. The light from the organic light emitting element LD is used in displaying an image.

Referring again to FIG. 1, the scanning driver 400 is connected to the scanning signal lines of the display panel 300 and applies scanning signals Vg consisting of a combination of a high voltage and a low voltage to the scanning signal lines.

The high voltage can interrupt the switching transistors Qs1-Qs3, and the low voltage can electrically connect the switching transistors Qs1-Qs3. The driving voltage Vdd can be applied through the driving voltage line.

The data driver 500 is connected to data lines of the display panel 300 and applies a data voltage Vdat for representing an image signal to the data lines.

The signal controller 600 controls operations of the scanning driver 400 and the data driver 500.

Each of the driving devices 400, 500, and the controller 600 may be directly mounted on the display panel 300 in at least one IC chip form, may be mounted on a flexible printed circuit film (not shown) to be attached to the display panel 300 in a tape carrier package (TCP) form, or may be mounted on a separate printed circuit board (PCB) (not shown). Alternatively, the driving devices 400, 500, and the controller 600 together with the signal lines and the transistors Qs1-Qs3 and Qd may be integrated at the display panel 300. Furthermore, the driving devices 400, 500, and the controller 600 may be integrated into a single chip. In this case, at least one of them, or at least one circuit element making up these units, may be disposed at the outside of a single chip.

A display operation of the organic light emitting device will now be described in detail with reference to FIGS. 1 to 7.

Figure 3:
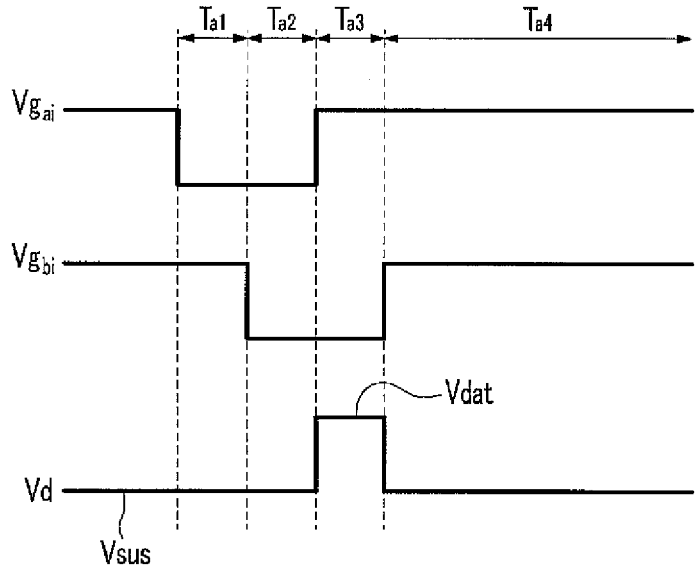
FIG. 3 is a waveform diagram illustrating driving signals that are applied to pixels of one row in an organic light emitting device according to an exemplary embodiment of the present invention.

FIG. 3 is a waveform diagram illustrating driving signals that are applied to pixels of one row in an organic light emitting device according to an exemplary embodiment of the present invention, and FIGS. 4 to 7 are equivalent circuit diagrams of one pixel at each period that is shown in FIG. 3.

The signal controller 600 receives an input image signal Din and an input control signal ICON for controlling the display of the input image signal Din supplied from an external graphics controller (not shown). The input image signal Din contains luminance information for each pixel PX, wherein the luminance corresponds to a predetermined gray value, for example, $1024=2^{10}$, $256=2^{8}$, or $64=2^{6}$. The input control signal ICON includes, for example, a vertical synchronization signal, a horizontal synchronizing signal, a main clock signal, and a data enable signal.

The signal controller 600 appropriately processes the input image signal Din to correspond to an operating condition of the display panel 300 based on the input image signal Din and the input control signal ICON and generates a scanning control signal CONT1 and a data control signal CONT2. The signal controller 600 sends the scanning control signal CONT1 to the scanning driver 400, and sends the data control signal CONT2 and an output image signal Dout to the data driver 500.

The scanning control signal CONT1 may include a scanning start signal for instructing the scanning start of a high voltage to the scanning signal lines, at least one clock signal for controlling an output period of the high voltage, and an output enable signal for limiting a time duration of the high voltage.

The data control signal CONT2 includes a horizontal synchronization start signal for notifying the transmission start of the digital image signal Dout for pixels PX of one row and a load signal and a data clock signal for allowing an analog data voltage to be applied to the data lines.

The scanning driver 400 changes a voltage of scanning signals Vgai and Vgbi that are applied to the scanning signal lines to a high voltage or a low voltage according to the scanning control signal CONT1 from the signal controller 600.

The data driver 500 receives the digital output image signal Dout for pixels PX of each row, converts the output image signal Dout to an analog data voltage Vdat, and then applies the analog data voltage Vdat to the data lines, according to the data control signal CONT2 from the signal controller 600. The data driver 500 outputs the data voltage Vdat for pixels PX of one row for one horizontal period (1H), as shown in FIG. 3.

Hereinafter, a specific pixel row, for example an i-th row, will be described.

Referring to FIG. 3, the scanning driver 400 changes a voltage of the first scanning signal Vgai to a low voltage and sustains a voltage of the second scanning signal Vgbi at a high voltage according to the scanning control signal CONT1 from the signal controller 600.

Figure 4:
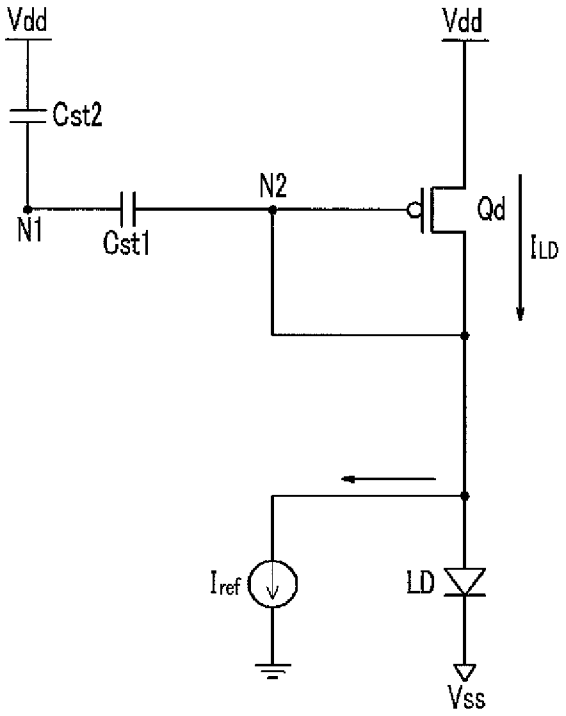
FIGS. 4 to 7 are equivalent circuit diagrams of one pixel at each time period that is shown in FIG. 3.

Accordingly, as shown in FIG. 4, the first switching transistor Qs1 sustains a turned off state, and the second and third switching transistors Qs2 and Qs3 are turned on. Therefore, the control terminal and the output terminal of the driving transistor Qd are connected, and the output terminal of the driving transistor Qd is connected to a reference current source Iref. This is referred to as a first period Ta1, shown in FIG. 3.

Accordingly, the driving transistor Qd is connected as a diode to allow an output current $I_{LD}$, which is controlled by a voltage difference (Vgs) between the control terminal and the input terminal of the driving transistor Qd, to flow. In this case, a voltage ($V_{N2}$) of the contact point N2 becomes a specific voltage for causing a current to flow through the driving transistor Qd, and a threshold voltage (Vth) and the electric field effect mobility μ of the driving transistor Qd are reflected in the specific voltage. This is referred to as a reference voltage (Vref).

Because the output terminal of the driving transistor Qd is connected to the reference current source Iref, the current $I_{LD}$ flows to the reference current source Iref instead of flowing to the organic light emitting element LD, as indicated by an arrow in FIG. 4, whereby the organic light emitting element LD does not emit light.

Thereafter, the scanning driver 400 sustains a voltage of the first scanning signal Vgai at a low voltage and changes a voltage of the second scanning signal Vgbi from a high voltage to a low voltage according to the scanning control signal CONT1 from the signal controller 600.

Figure 5:
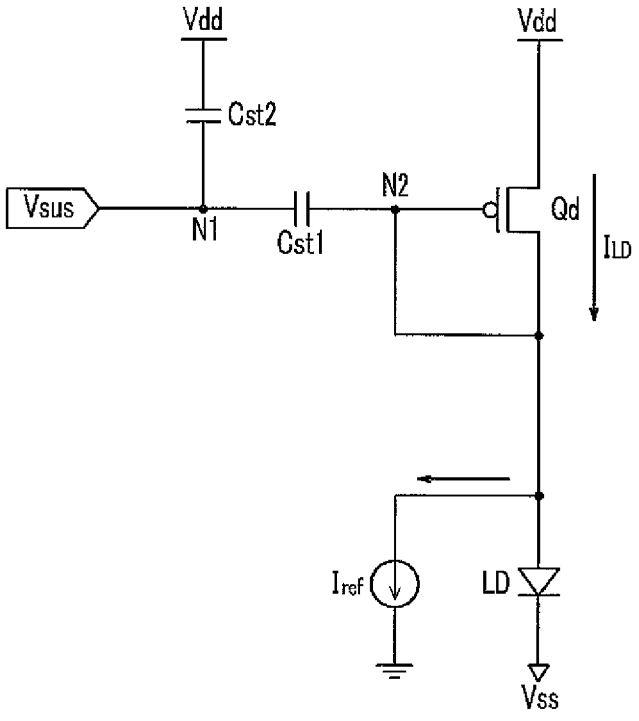

Accordingly, as shown in FIG. 5, the first switching transistor Qs1 is turned on and the second and third switching transistors Qs2 and Qs3 sustain an a turned on state, and this is referred to as a second period Ta2, as shown in FIG. 3.

At the second period Ta2, the driving transistor Qd is in a diode connection state, and a current flows through the driving transistor Qd until a voltage (Vgs) between the control terminal and the input terminal thereof becomes equal to the threshold voltage (Vth) of the driving transistor Qd.

An input voltage Vd shown in FIG. 3 consists of a sustain voltage Vsus and a data voltage Vdat. At the first and second periods Ta1 and Ta2, because the input voltage Vd is the sustain voltage Vsus, the sustain voltage Vsus is applied to the contact point N1. Accordingly, a voltage Vcst1 that is charged at the first capacitor Cst1 is represented by Equation 1.

$$Vcst1 = Vref - Vsus \quad \text{[Equation 1]}$$

Thereafter, the scanning driver 400 changes a voltage of the first scanning signal Vgai from a low voltage to a high voltage and sustains a voltage of the second scanning signal Vgbi at a low voltage according to the scanning control signal CONT1 from the signal controller 600.

Figure 6:
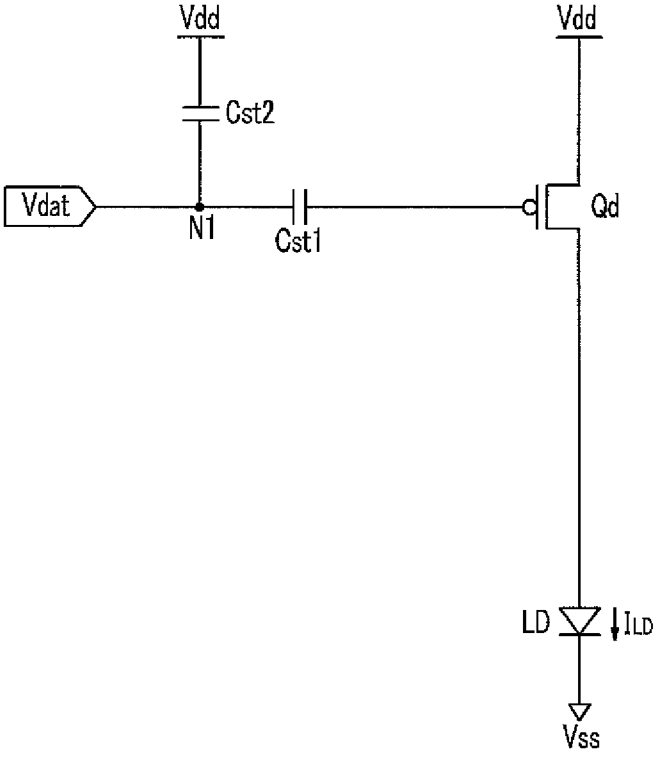

Accordingly, as shown in FIG. 6, the first switching transistor Qs1 sustains a turned on state, and the second and third switching transistors Qs2 and Qs3 are turned off, and this is referred to as a third period Ta3, as shown in FIG. 3.

At the third period Ta3, because the input voltage Vd is the data voltage Vdat, the data voltage Vdat is applied to the contact point N1, and the voltage ($V_{N2}$) of the contact point N2 changes to a value that is represented by Equation 2.

$$V_{N2} = Vref - Vsus + Vdat \quad \text{[Equation 2]}$$

In this case, because the output terminal of the driving transistor Qd is in a state where a connection to the reference current source Iref is disconnected, an output current $I_{LD}$ of the driving transistor Qd is supplied to the organic light emitting element LD, and the organic light emitting element LD emits light with different intensities according to the magnitude of the output current $I_{LD}$, wherein the light can be used for displaying an image. In this case, the output current $I_{LD}$ of the driving transistor Qd is represented by Equation 3.

$$\begin{aligned} I_{LD} &= \frac{1}{2} \times \mu \times Ci \times \frac{W}{L} \times (Vgs - Vth)^2 \\ &= \frac{1}{2} \times \mu \times Ci \times \frac{W}{L} \times (V_{N2} - Vdd - Vth)^2 \\ &= \frac{1}{2} \times \mu \times Ci \times \frac{W}{L} \times \\ &\quad (Vref - Vsus + Vdat - Vdd - Vth)^2 \end{aligned} \quad \text{[Equation 3]}$$

where μ is electric field effect mobility, Ci is capacity of a gate insulating layer, W is a channel width of the driving transistor Qd, and L is a channel length of the driving transistor Qd.

As described above, because the reference voltage Vref is a voltage in which the threshold voltage Vth and the electric field effect mobility μ of the driving transistor Qd are reflected, the output current $I_{LD}$ is determined only by the data voltage Vdat, as well as the fixed sustain voltage Vsus and driving voltage Vdd, regardless of the threshold voltage Vth and the electric field effect mobility μ of the driving transistor Qd according to Equation 3. Therefore, the output current $I_{LD}$ is not influenced by the threshold voltage Vth and the electric field effect mobility μ of the driving transistor Qd.

Therefore, even if there is a deviation in the threshold voltages Vth and the electric field effect mobility μ between the driving transistors Qd of the plurality of pixels PX, or even if a magnitude of a threshold voltage Vth and electric field effect mobility μ of each driving transistor Qd sequentially changes, a display device can display a uniform image.

Thereafter, the scanning driver 400 sustains a voltage of the first scanning signal Vgai at a high voltage and changes a voltage of the second scanning signal Vgbi from a low voltage to a high voltage according to the scanning control signal CONT1 from the signal controller 600.

Figure 7:
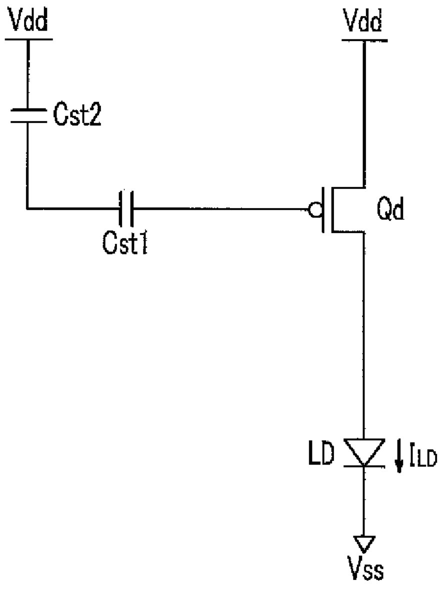

Accordingly, as shown in FIG. 7, the first switching transistor Qs1 is turned off, and the second and third switching transistors Qs2 and Qs3 sustain a turned off state, and this is referred to as a fourth period Ta4, as shown in FIG. 3.

At the fourth period Ta4, the organic light emitting element LD is used to display an image while emitting light according to the output current $I_{LD}$ of the driving transistor Qd that is determined at the third period Ta3. In this case, the contact point N1 is connected to a driving voltage Vdd, which is a fixed constant voltage with the second capacitor Cst2 interposed therebetween. That is, because the second capacitor Cst2 is not electrically floated, at the fourth period Ta4, the output current $I_{LD}$ of the driving transistor Qd can be constantly sustained at a value as determined by Equation 3.

The fourth period Ta4 is continued until a first period Ta1 for pixels PX of an i-th row restarts at a next frame, and even at pixels PX of a next row, operations at each of the periods Ta1-Ta4 are equally repeated. In this way, the control of the periods Ta1-Ta4 is sequentially performed at all scanning signals, and corresponding images are displayed in all pixels PXs.

The first period Ta1 may be omitted, and in this case, at the second period Ta2, a voltage of the contact point N2 is a reference voltage Vref.

An organic light emitting device according to an exemplary embodiment of the present invention will now be described in detail with reference to FIGS. 8 to 12.

Figure 8:
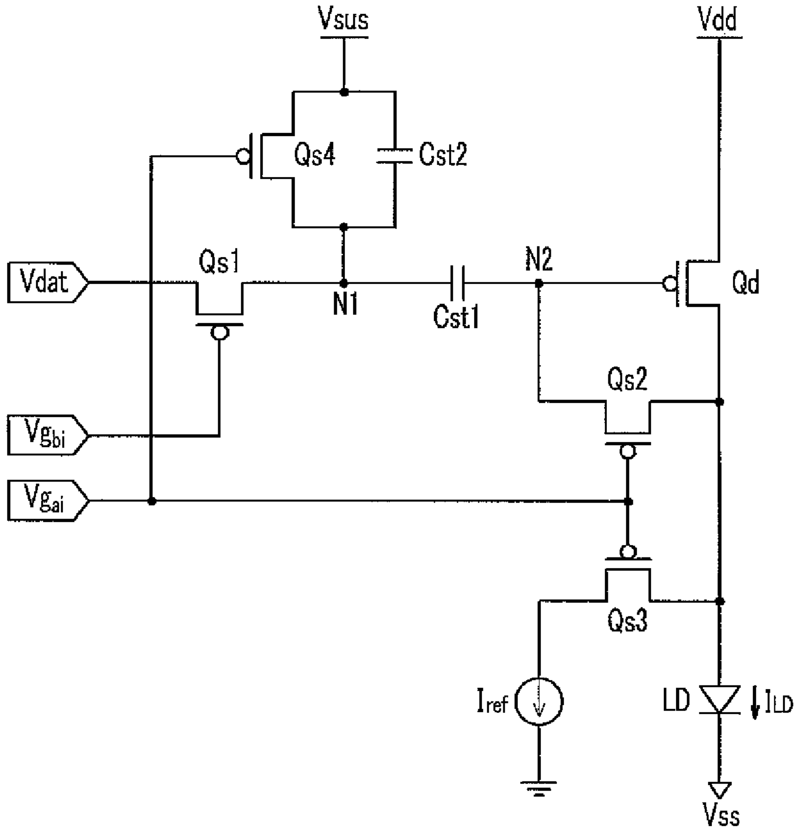
FIG. 8 is a circuit diagram of one pixel of an organic light emitting device according to an exemplary embodiment of the present invention.
Figure 9:
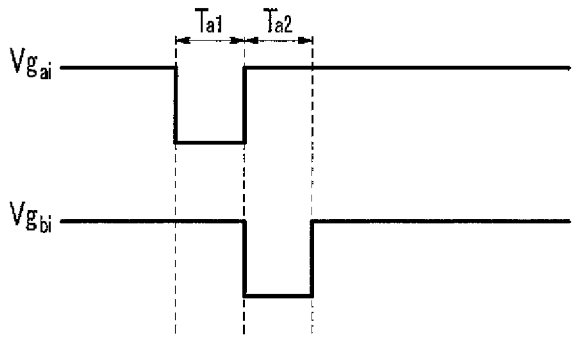
FIG. 9 is a waveform diagram illustrating driving signals that are applied to pixels of one row in an organic light emitting device according to an exemplary embodiment of the present invention.
Figure 10:
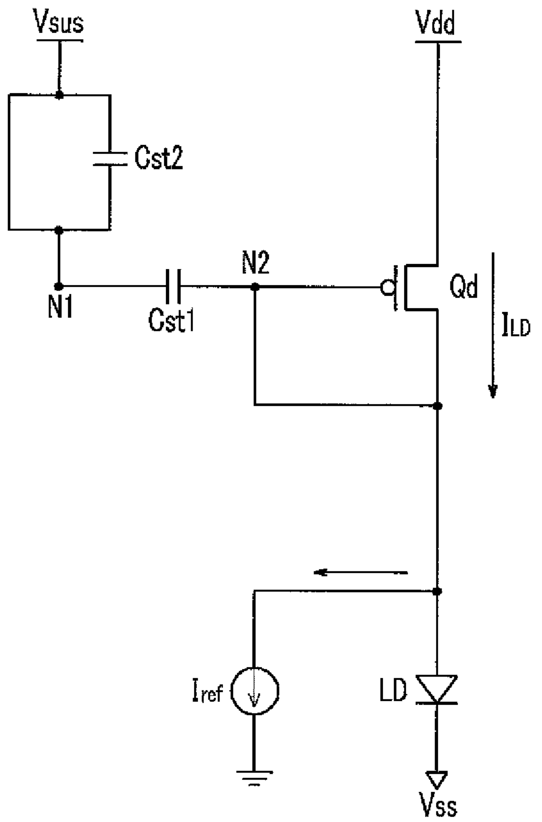
FIGS. 10 to 12 are equivalent circuit diagrams of one pixel at each time period that is shown in FIG. 8.
Figure 11:
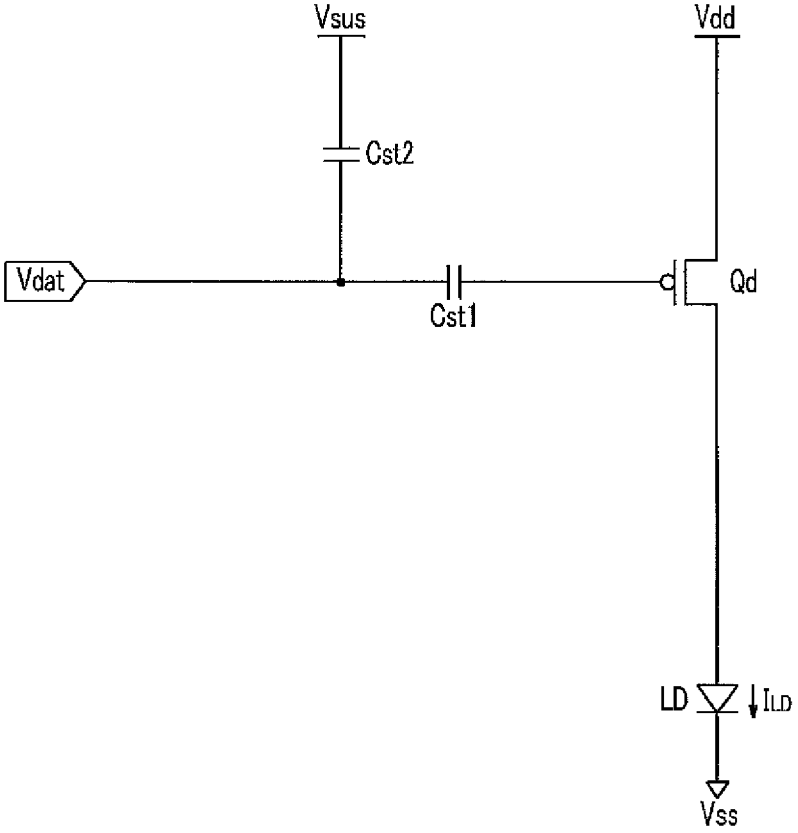
Figure 12:
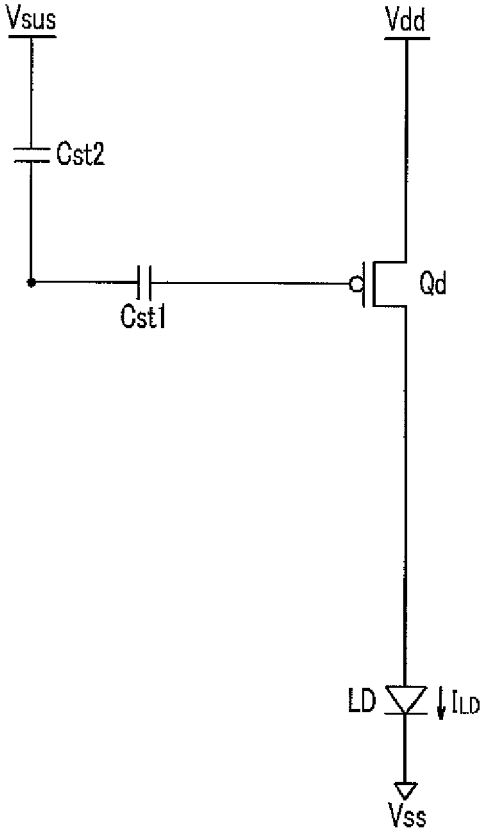

FIG. 8 is a circuit diagram of one pixel of an organic light emitting device according to an exemplary embodiment of the present invention, FIG. 9 is a waveform diagram illustrating driving signals that are applied to pixels of one row in an organic light emitting device according to an exemplary embodiment of the present invention, and FIGS. 10 to 12 are equivalent circuit diagrams of one pixel at each period that is shown in FIG. 8.

Referring to FIG. 8, like the organic light emitting device of FIG. 2, each pixel PX of the organic light emitting device according to an exemplary embodiment of the present invention includes an organic light emitting element LD, a driving transistor Qd, a first capacitor Cst1, a second capacitor Cst2, and first, second, and third switching transistors Qs1-Qs3.

Unlike the organic light emitting device of FIG. 2, however, the organic light emitting device of FIG. 8 further includes a fourth switching transistor Qs4. The fourth switching transistor Qs4 operates in response to the first scanning signal Vgai and is connected between a sustain voltage Vsus and a contact point, as shown in FIG. 8.

At the contact point N1, one end of the second capacitor Cst2 is connected to the first capacitor Cst1 and the first switching transistor Qs1, and the other end thereof is connected to the sustain voltage Vsus.

Hereinafter, at a specific pixel row, for example an i-th row, operation of the organic light emitting device of FIG. 8 will be described in detail.

Referring to FIG. 9, the scanning driver 400 changes a voltage of the first scanning signal Vgai to a low voltage and sustains a voltage of the second scanning signal Vgbi at a high voltage according to the scanning control signal CONT1 from the signal controller 600.

Accordingly, as shown in FIG. 10, the first switching transistor Qs1 sustains a turned off state, and the second, third, and fourth switching transistors Qs2, Qs3, and Qs4 are turned on. Therefore, the control terminal and the output terminal of the driving transistor Qd are connected, and the output terminal of the driving transistor Qd is connected to a reference current source Iref. Accordingly, the driving transistor Qd performs diode connection to allow an output current $I_{LD}$ that is controlled by a voltage difference Vgs between the control terminal and the input terminal of the driving transistor Qd to flow. In this case, a voltage $V_{N2}$ of the contact point N2 is a reference voltage Vref in which a threshold voltage Vth and electric field effect mobility μ of the driving transistor Qd are reflected.

In this case, as shown in FIG. 10, the organic light emitting element LD does not emit light.

The output current $I_{LD}$ of the driving transistor Qd flows until a voltage Vgs between the control terminal and the input terminal of the driving transistor Qd becomes equal to the threshold voltage Vth of the driving transistor Qd. At the first and second periods Ta1 and Ta2, because the sustain voltage Vsus is applied to the contact point N1, a voltage Vcst1 that is charged at the first capacitor Cst1 is represented by Equation 1.

Thereafter, the scanning driver 400 changes a voltage of the first scanning signal Vgai from a low voltage to a high voltage and changes a voltage of the second scanning signal Vgbi from a high voltage to a low voltage according to the scanning control signal CONT1 from the signal controller 600.

Accordingly, as shown in FIG. 11, the first switching transistor Qs1 is turned on the second and third switching transistors Qs2 and Qs3 sustain a turned on state, and the fourth switching transistor Qs4 is turned off.

A data voltage Vdat is applied to the contact point N1, and the charge voltage Vcst1 of the first capacitor Cst1 is represented by Equation 2.

In this case, a current flowing to the driving transistor Qd is supplied to the organic light emitting element LD, and the organic light emitting element LD emits light with different intensities according to a magnitude of the output current $I_{LD}$, thereby being used for displaying an image. In this case, the output current $I_{LD}$ is represented by Equation 3.

According to Equation 3, the output current $I_{LD}$ is determined only by the data voltage Vdat, the fixed sustain voltage Vsus and the driving voltage Vdd, regardless of the threshold voltage Vth and electric field effect mobility μ of the driving transistor Qd.

Thereafter, the scanning driver 400 sustains a voltage of the first scanning signal Vgai at a high voltage and changes a voltage of the second scanning signal Vgbi from a low voltage to a high voltage according to the scanning control signal CONT1 from the signal controller 600.

Accordingly, as shown in FIG. 12, the first switching transistor Qs1 is turned off, and the second, third, and fourth switching transistors Qs2, Qs3, and Qs4 sustain a turned off state.

In this case, the organic light emitting element LD emits light for displaying an image according to the output current $I_{LD}$ of the driving transistor Qd that is determined by Equation 3. In this case, the contact point N1 is connected to the sustain voltage Vsus, which is a fixed constant voltage, with the second capacitor Cst2 interposed therebetween. That is, because the first capacitor Cst1 is not electrically floated, the output current $I_{LD}$ of the driving transistor Qd may be constantly sustained at a value set by Equation 3.

In this way, unlike the organic light emitting device of FIG. 2, in the organic light emitting device of FIG. 8, by adding the fourth switching transistor Qs4 that is connected to the sustain voltage Vsus, it is unnecessary to selectively apply a sustain voltage Vsus to an input voltage Vd that is connected to the first switching transistor Qs1.

An organic light emitting device according to an exemplary embodiment of the present invention will now be described in detail with reference to FIGS. 13 to 16.

Figure 13:
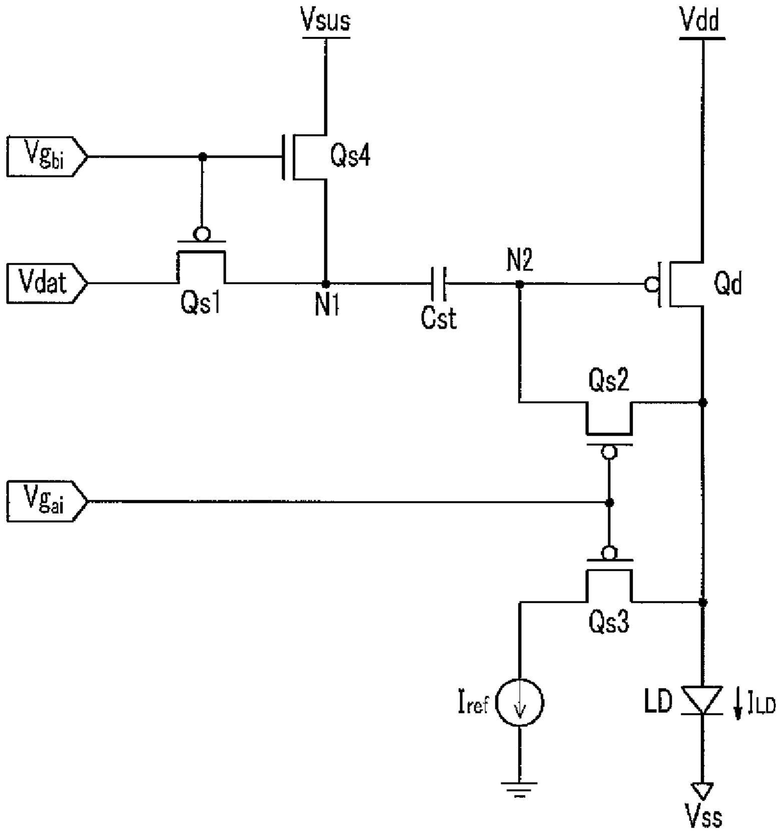
FIG. 13 is a circuit diagram of one pixel of an organic light emitting device according to an exemplary embodiment of the present invention.
Figure 14:
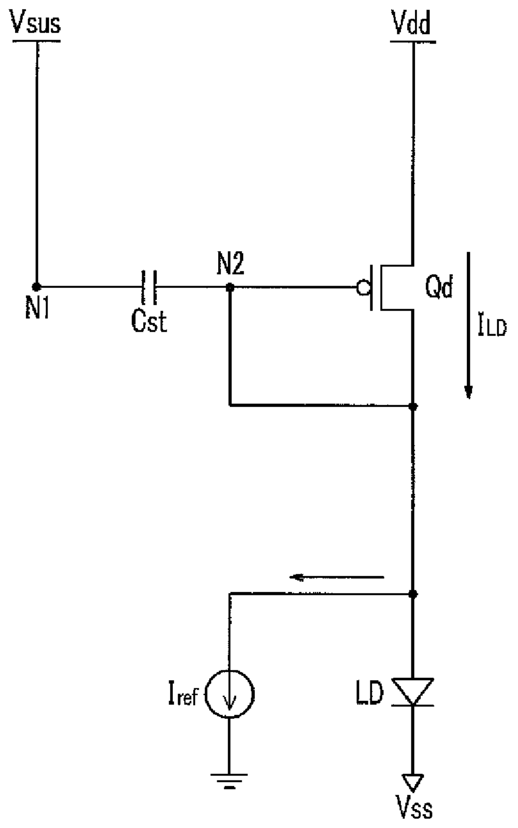
FIGS. 14 to 16 are equivalent circuit diagrams of one pixel according to a driving state of the organic light emitting device of FIG. 13.
Figure 15:
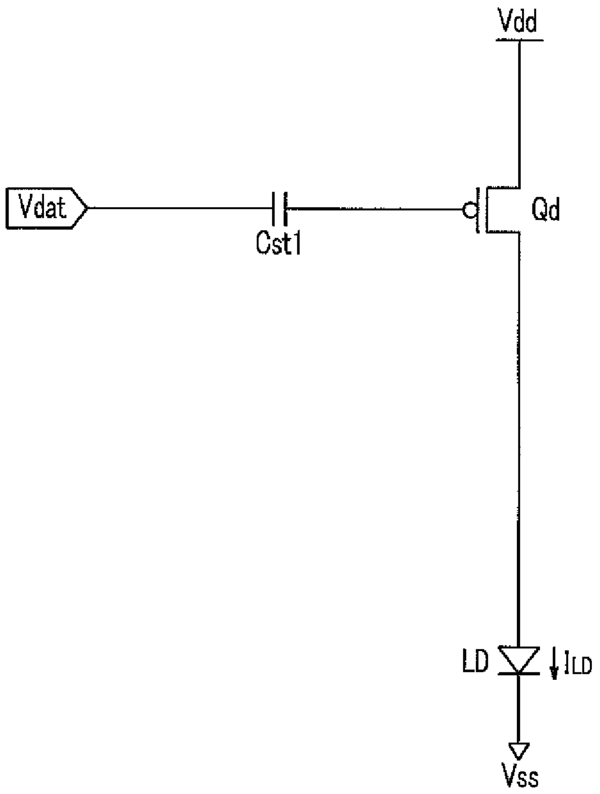
Figure 16:
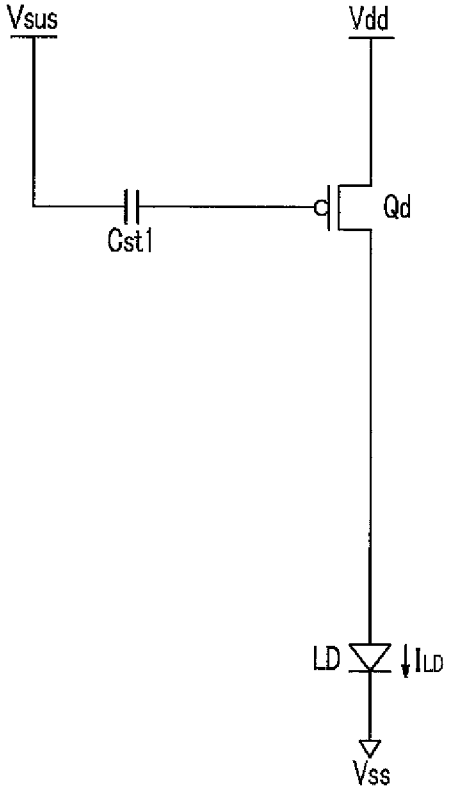

FIG. 13 is a circuit diagram of one pixel of an organic light emitting device according to an exemplary embodiment of the present invention, and FIGS. 14 to 16 are equivalent circuit diagrams of one pixel according to a driving state of the organic light emitting device of FIG. 13.

Referring to FIG. 13, like the organic light emitting device of FIG. 8, each pixel PX of the organic light emitting device according to an exemplary embodiment of the present invention includes an organic light emitting element LD, a driving transistor Qd, a capacitor Cst, and first, second, third, and fourth switching transistors Qs1-Qs4.

Unlike the organic light emitting device of FIG. 8, however, the organic light emitting device of FIG. 13 does not include a capacitor that is connected between the sustain voltage Vsus and the contact point N1. Furthermore, unlike the organic light emitting device of FIG. 8, in the organic light emitting device of FIG. 13, the fourth switching transistor Qs4 is an n-channel electric field effect transistor, and the first and fourth switching transistors Qs1 and Qs4 commonly operate in response to the second scanning signal Vgbi.

Hereinafter, at a specific pixel row, for example an i-th row, operation of the organic light emitting device of FIG. 13 will be described in detail.

First and second scanning signals Vgai and Vgbi that are applied to the organic light emitting device of FIG. 13 have the same waveforms as shown in the waveform diagram of FIG. 9.

Referring to FIG. 9, the scanning driver 400 of FIG. 1 changes a voltage of the first scanning signal Vgai to a low voltage and sustains a voltage of the second scanning signal Vgbi at a high voltage according to the scanning control signal CONT1 from the signal controller 600. Accordingly, as shown in FIG. 14, the first switching transistor Qs1 sustains a turned off state, and the second, third, and fourth switching transistors Qs2, Qs3, and Qs4 are turned on. Accordingly, like FIG. 4, a voltage of a contact point N2 is a reference voltage Vref in which a threshold voltage Vth and electric field effect mobility μ of the driving transistor Qd are reflected. In this case, like FIG. 10, the organic light emitting element LD does not emit light.

Because a sustain voltage Vsus is applied to a contact point N1, a voltage Vcst1 that is charged at the first capacitor Cst1 is represented by Equation 1.

Thereafter, the scanning driver 400 changes a voltage of the first scanning signal Vgai from a low voltage to a high voltage and changes a voltage of the second scanning signal Vgbi from a high voltage to a low voltage according to the scanning control signal CONT1 from the signal controller 600.

Thereafter, as shown in FIG. 15, the first switching transistor Qs1 is turned on and the second, third, and fourth switching transistors Qs2, Qs3, and Qs4 are turned off. At the contact point N1, a data voltage Vdat is applied and a charge voltage Vcst1 of the first capacitor is represented by Equation 2.

In this case, a current flowing to the driving transistor Qd is supplied to the organic light emitting element LD, and the organic light emitting element LD emits light with different intensities according to a magnitude of the output current $I_{LD}$, wherein the emitted light is used for displaying an image. In this case, the output current $I_{LD}$ is represented by Equation 3.

According to Equation 3, the output current $I_{LD}$ is determined only by the data voltage Vdat and the fixed sustain voltage Vsus and driving voltage Vdd regardless of the threshold voltage Vth and the electric field effect mobility μ of the driving transistor Qd.

Thereafter, the scanning driver 400 sustains a voltage of the first scanning signal Vgai at a high voltage and changes a voltage of the second scanning signal Vgbi from a low voltage to a high voltage according to the scanning control signal CONT1 from the signal controller 600.

Accordingly, as shown in FIG. 16, the first switching transistor Qs1 is turned off, the second and third switching transistors Qs2 and Qs3 sustain a turned off state, and the fourth switching transistor Qs4 is turned on. Accordingly, the organic light emitting element LD displays an image while emitting light according to the output current $I_{LD}$ of the driving transistor Qd that is determined by Equation 3. In this case, the contact point N1 is connected to a sustain voltage Vsus, which is a fixed constant voltage. That is, because the capacitor Cst is not electrically floated, the output current $I_{LD}$ of the driving transistor Qd may be constantly sustained.

In this way, when compared with the organic light emitting device of FIG. 8, because the organic light emitting device of FIG. 13 omits one capacitor, a pixel can be relatively simply formed. Furthermore, in the organic light emitting device of FIG. 13, a channel type of the fourth switching transistor is changed and, thus, a scanning signal is differently applied.

An organic light emitting device according to an exemplary embodiment of the present invention will now be described in detail with reference to FIGS. 17 to 20.

Figure 17:
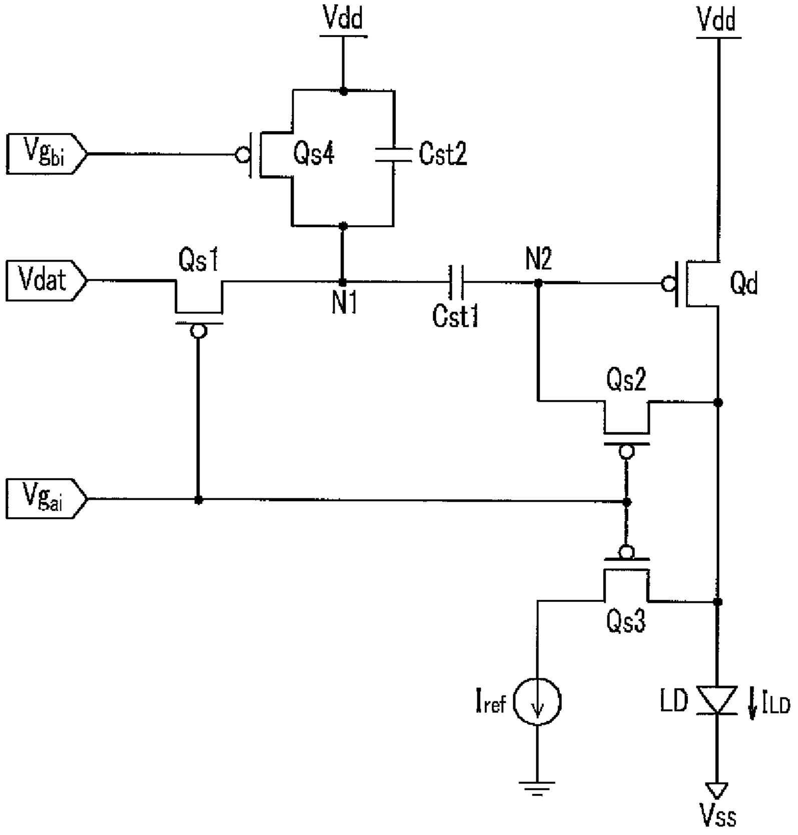
FIG. 17 is a circuit diagram of one pixel of an organic light emitting device according to an exemplary embodiment of the present invention.
Figure 18:
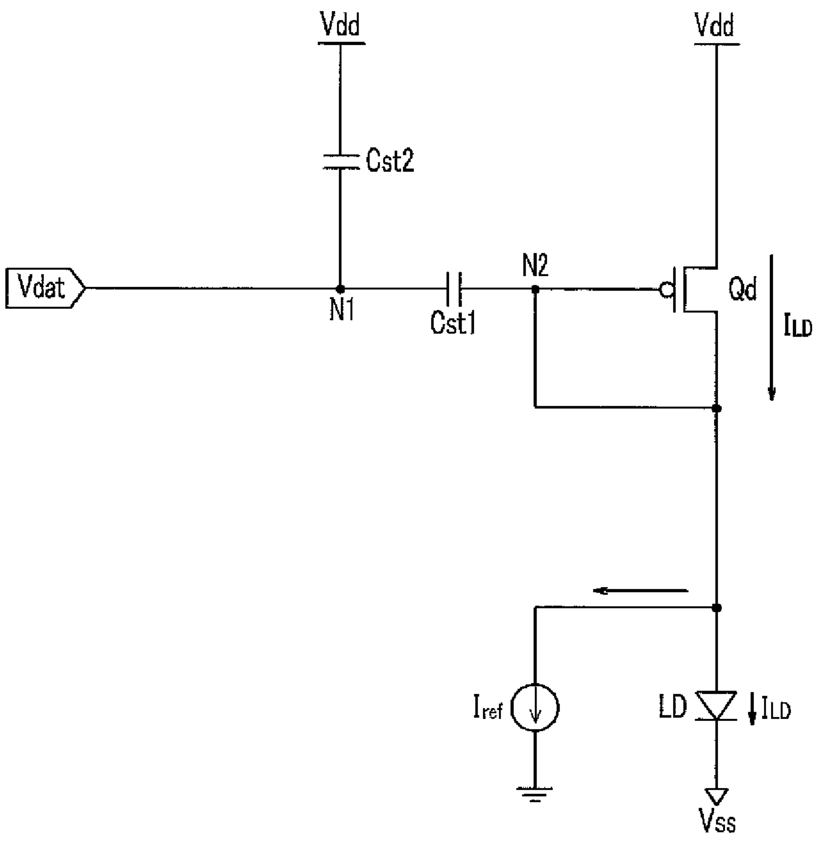
FIGS. 18 to 20 are equivalent circuit diagrams of one pixel according to a driving state of the organic light emitting device of FIG. 17.
Figure 19:
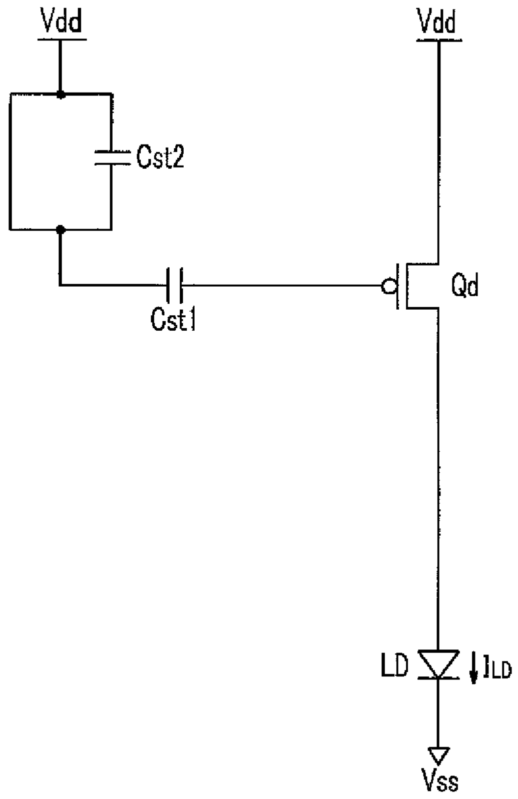
Figure 20:
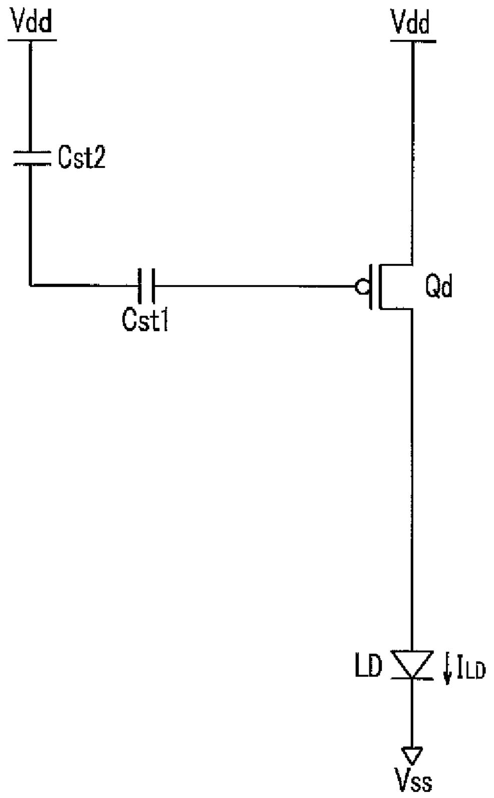

FIG. 17 is a circuit diagram of one pixel of an organic light emitting device according to an exemplary embodiment of the present invention, and FIGS. 18 to 20 are equivalent circuit diagrams of one pixel according to a driving state of the organic light emitting device of FIG. 17.

Referring to FIG. 17, like the organic light emitting device of FIG. 8, each pixel PX of the organic light emitting device according to the present exemplary embodiment of the present invention includes an organic light emitting element LD, a driving transistor Qd, a first capacitor Cst1, a second capacitor Cst2, and first, second, third, and fourth switching transistors Qs1-Qs4.

Unlike the organic light emitting device of FIG. 8, however, in the organic light emitting device of FIG. 17, the fourth switching transistor Qs4 and the second capacitor Cst2 are connected in parallel between the contact point N1 and the driving voltage Vdd.

Hereinafter, at a specific pixel row, for example an i-th row, operation of the organic light emitting device of FIG. 17 will be described in detail.

First and second scanning signals Vgai and Vgbi that are applied to the organic light emitting device of FIG. 17 have the same waveforms as shown in the waveform diagram of FIG. 9.

Referring to FIG. 9, the scanning driver 400 changes a voltage of the first scanning signal Vgai to a low voltage and sustains a voltage of the second scanning signal Vgbi at a high voltage according to the scanning control signal CONT1 from the signal controller 600.

Accordingly, as shown in FIG. 18, the first, second, and third switching transistors Qs1, Qs2, and Qs3 are turned on, and the fourth switching transistor Qs4 is turned off. Therefore, the control terminal and the output terminal of the driving transistor Qd are connected, and the output terminal of the driving transistor Qd is connected to a reference current source Iref.

Accordingly, the driving transistor Qd is connected as a diode to allow an output current $I_{LD}$ that is controlled by a voltage difference Vgs between the control terminal and the input terminal of the driving transistor Qd to flow. In this case, a voltage $V_{N2}$ of the contact point N2 becomes a reference voltage Vref in which a threshold voltage Vth and an electric field effect mobility μ of the driving transistor Qd are reflected.

In this case, as shown in FIG. 18, the organic light emitting element LD does not emit light.

The driving transistor Qd sustains a diode connection state, and a current flows through the driving transistor Qd until a voltage Vgs between the control terminal and the input terminal thereof becomes equal to a threshold voltage Vth of the driving transistor Qd.

Because the data voltage Vdat is applied to the contact point N1, a voltage Vcst1 that is charged at the first capacitor Cst1 is represented by Equation 4.

$$Vcst1 = Vref - Vdat \quad \text{[Equation 4]}$$

Thereafter, the scanning driver 400 of FIG. 1 changes a voltage of the first scanning signal Vgai from a low voltage to a high voltage and changes a voltage of the second scanning signal Vgbi from a high voltage to a low voltage according to the scanning control signal CONT1 from the signal controller 600.

Accordingly, as shown in FIG. 19, the first, second, and third switching transistors Qs1, Qs2, and Qs3 are turned off, and the fourth switching transistor Qs4 is turned on. Accordingly, a voltage $V_{N2}$ of the contact point N2 changes to a value that is represented by Equation 5.

$$V_{N2} = Vref - Vdat + Vdd \quad \text{[Equation 5]}$$

In this case, a current flowing through the driving transistor Qd is supplied to the organic light emitting element LD, and the organic light emitting element LD emits light with different intensities according to a magnitude of the output current $I_{LD}$, thereby being used for displaying an image. In this case, the output current $I_{LD}$ is represented by Equation 6.

$$I_{LD} = \frac{1}{2} \times \mu \times Ci \times \frac{W}{L} \times (Vgs - Vth)^2 \quad \text{[Equation 6]}$$
$$= \frac{1}{2} \times \mu \times Ci \times \frac{W}{L} \times (V_{N2} - Vdd - Vth)^2$$
$$= \frac{1}{2} \times \mu \times Ci \times \frac{W}{L} \times (Vref - Vdat + Vdd - Vdd - Vth)^2$$
$$= \frac{1}{2} \times \mu \times Ci \times \frac{W}{L} \times (Vref - Vdat - Vth)^2$$

As described above, because the reference voltage Vref is a voltage in which a threshold voltage Vth and an electric field effect mobility μ of the driving transistor Qd are reflected, the output current $I_{LD}$ is determined only by the data voltage Vdat regardless of the threshold voltage Vth and the electric field effect mobility μ of the driving transistor Qd, according to Equation 3. Therefore, the output current $I_{LD}$ is not influenced by the threshold voltage Vth and the electric field effect mobility μ of the driving transistor Qd.

Thereafter, the scanning driver 400 sustains a voltage of the first scanning signal Vgai at a high voltage and changes a voltage of the second scanning signal Vgbi from a low voltage to a high voltage according to the scanning control signal CONT1 from the signal controller 600.

Accordingly, as shown in FIG. 20, the first, second, and third switching transistors Qs1, Qs2, and Qs3 sustain an a turned off state, and the fourth switching transistor Qs4 is turned off.

Accordingly, the organic light emitting element LD displays an image while emitting light according to the output current $I_{LD}$ of the driving transistor Qd that is determined by Equation 6. In this case, the contact point N1 is connected to a driving voltage Vdd, which is a fixed constant voltage, with the second capacitor Cst2 interposed therebetween. That is, because the first capacitor Cst1 is not electrically floated, the output current $I_{LD}$ of the driving transistor Qd can be constantly sustained.

In this way, because the organic light emitting device according to FIG. 17 first applies a data voltage Vdat and then a driving voltage Vdd to the contact point N1, the output current $I_{LD}$ of the driving transistor Qd is not influenced by the driving voltage Vdd. Therefore, even if the driving voltage Vdd changes, luminance of each pixel is sustained without being influenced.

An organic light emitting device according to an exemplary embodiment of the present invention will now be described in detail with reference to FIGS. 21 to 24.

Figure 21:
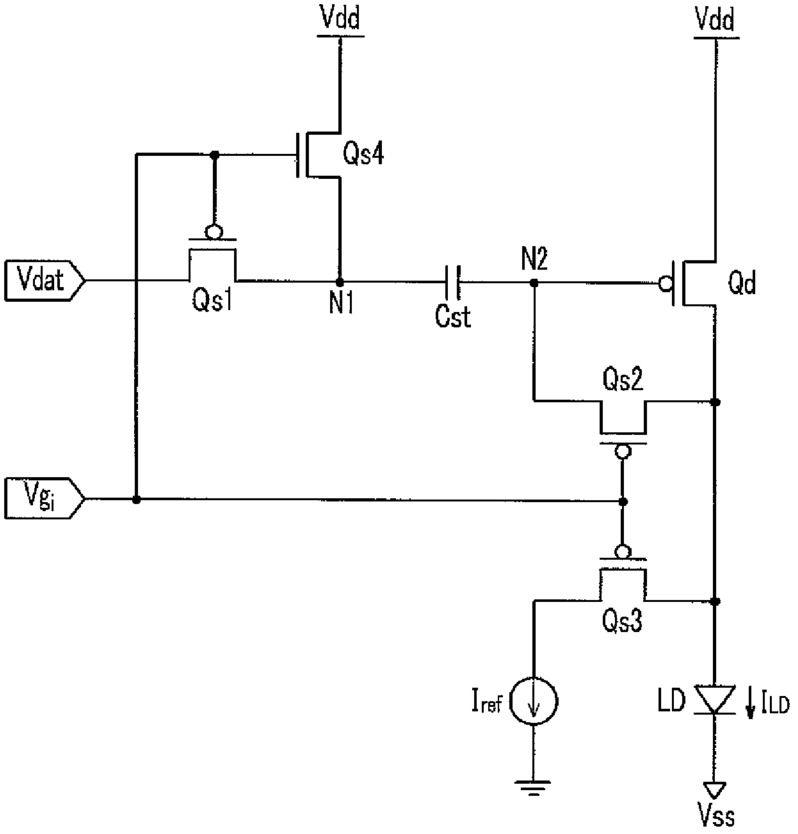
FIG. 21 is a circuit diagram of one pixel of an organic light emitting device according to an exemplary embodiment of the present invention.
Figure 22:
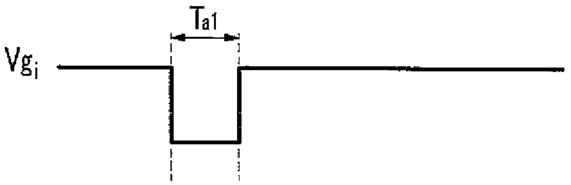
FIG. 22 is a waveform diagram illustrating a driving signal that is applied to pixels of one row in an organic light emitting device according to an exemplary embodiment of the present invention.
Figure 23:
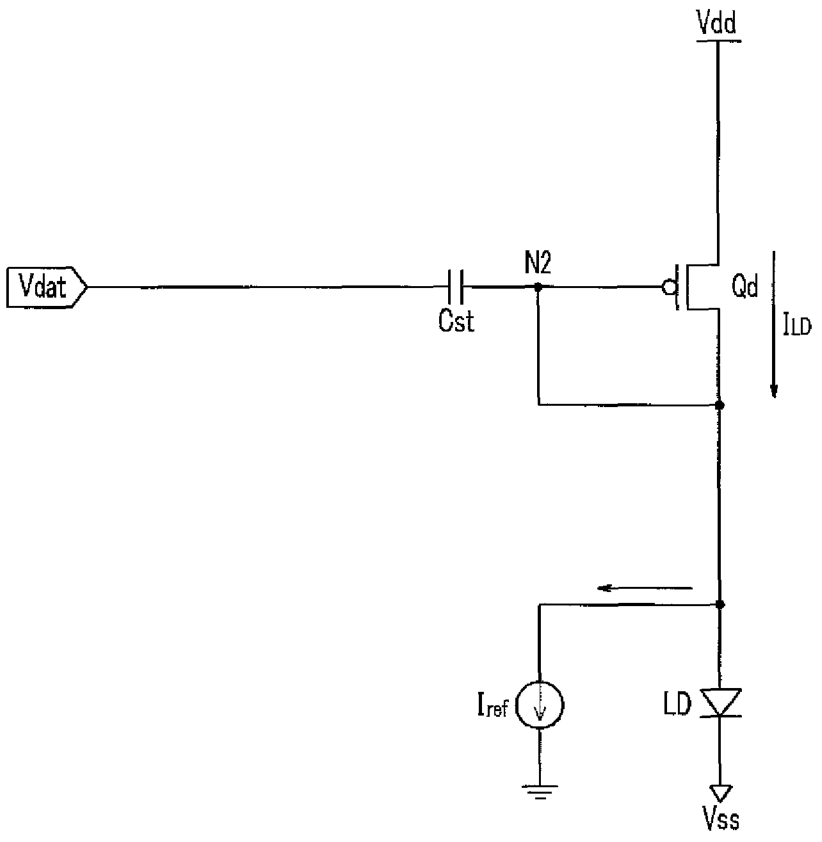
FIGS. 23 and 24 are equivalent circuit diagrams of a pixel that is shown in FIG. 21 at each time period that is shown in FIG. 22.
Figure 24:
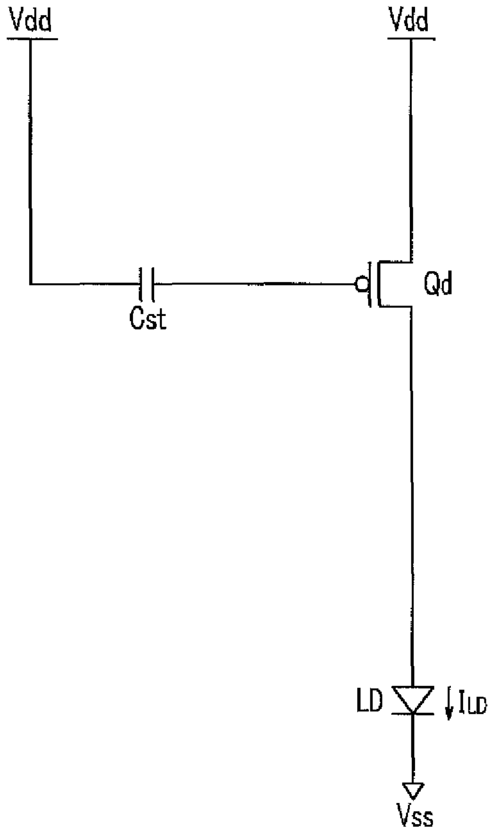

FIG. 21 is a circuit diagram of one pixel of an organic light emitting device according to an exemplary embodiment of the present invention, FIG. 22 is a waveform diagram illustrating a driving signal that is applied to pixels of one row in an organic light emitting device according to an exemplary embodiment of the present invention, and FIGS. 23 and 24 are equivalent circuit diagrams of the pixel that is shown in FIG. 21 at each period that is shown in FIG. 22.

Referring to FIG. 21, like the organic light emitting device of FIG. 13, each pixel PX of the organic light emitting device according to the present exemplary embodiment of the present invention includes an organic light emitting element LD, a driving transistor Qd, a capacitor Cst, and first, second, third, and fourth switching transistors Qs1-Qs4.

Unlike the organic light emitting device of FIG. 13, however, in the organic light emitting device of FIG. 21, the first to fourth switching transistors Qs1-Qs4 commonly operate in response to the first scanning signal Vgai, and the fourth switching transistor Qs4 is an n-channel electric field effect transistor.

Hereinafter, for a specific pixel row, for example an i-th row, operation of the organic light emitting device of FIG. 21 will be described in detail.

Referring to FIG. 22, the scanning driver 400 of FIG. 1 changes a voltage of the first scanning signal Vgi to a low voltage according to the scanning control signal CONT1 from the signal controller 600.

Accordingly, as shown in FIG. 23, the first, second, and third switching transistors Qs1, Qs2, and Qs3 are turned on, and the fourth switching transistor Qs4 is turned off. Therefore, the control terminal and the output terminal of the driving transistor Qd are connected, and the output terminal of the driving transistor Qd is connected to a reference current source Iref. Accordingly, the driving transistor Qd is connected as a diode to allow an output current $I_{LD}$ that is controlled by a voltage difference Vgs between the control terminal and the input terminal of the driving transistor Qd to flow. In this case, a voltage $V_{N2}$ of the contact point N2 is a reference voltage Vref in which a threshold voltage Vth and the electric field effect mobility μ of the driving transistor Qd are reflected.

The driving transistor Qd sustains the diode connection state, and a current flows through the driving transistor Qd until a voltage Vgs between the control terminal and the input terminal thereof becomes equal to a threshold voltage Vth of the driving transistor Qd.

At the first time period Ta1, because a data voltage Vdat is applied to a contact point N1, a voltage Vcst1 that is charged at the first capacitor Cst1 is as represented by Equation 4.

Thereafter, the scanning driver 400 changes a voltage of the first scanning signal Vgi from a low voltage to a high voltage according to the scanning control signal CONT1 from the signal controller 600.

Accordingly, as shown in FIG. 24, the first, second, and third switching transistors Qs1, Qs2, and Qs3 are turned off, and the fourth switching transistor Qs4 is turned on. In this case, a charge voltage Vcst1 of the first capacitor Cst1 changes to a value that is represented by Equation 5.

In this case, a current flowing through the driving transistor Qd is supplied to the organic light emitting element LD, and the organic light emitting element LD emits light with different intensities according to a magnitude of the output current $I_{LD}$, thereby for use in displaying an image. In this case, the output current $I_{LD}$ is represented by Equation 6.

Because a reference voltage Vref is a voltage in which a threshold voltage Vth and an electric field effect mobility μ of the driving transistor Qd are reflected, the output current $I_{LD}$ is determined only by the data voltage Vdat regardless of the threshold voltage Vth and the electric field effect mobility μ of the driving transistor Qd according to Equation 6. Therefore, the output current $I_{LD}$ is not influenced by the threshold voltage Vth and the electric field effect mobility μ of the driving transistor Qd.

In this case, because the contact point N1 is set to a driving voltage Vdd, which is a fixed constant voltage, the first capacitor Cst1 is not electrically floated and the output current $I_{LD}$ of the driving transistor Qd is constantly sustained.

In this way, when compared with the organic light emitting device according to other exemplary embodiments, because only one scanning signal is used in the organic light emitting device of FIG. 24, distortion of an input signal can be reduced.

While the present invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device comprising:

a light-emitting element;

a first capacitor that is connected between first and second contact points;

a driving transistor that has a control terminal connected to the second contact point, an input terminal connected to a driving voltage, and an output terminal connected to the light-emitting element;

a first switching transistor connected between a data voltage and the first contact point;

a second switching transistor connected between the second contact point and the output terminal of the driving transistor;

a third switching transistor connected between a reference current source and the output terminal of the driving transistor, wherein one of source and drain electrodes of the third switching transistor is electrically connected to one of source and drain electrodes of the driving transistor;

a fourth switching transistor connected between the first contact point and a sustain voltage; and a second capacitor connected between the first contact point and the sustain voltage in parallel with the fourth switching transistor, wherein one of source and drain electrodes of the fourth switching transistor is electrically connected to one terminal of the second capacitor and the other of the source and drain electrodes are electrically connected to another terminal of the second capacitor, wherein the driving voltage is different from the sustain voltage, wherein the data voltage transitions from a low level to a high level and the sustain voltage has the low level.

2. The display device of claim 1, wherein the second and third switching transistors are controlled by a first scanning signal and the first switching transistor is controlled by a second scanning signal.

3. The display device of claim 1, wherein the first, second, and third switching transistors are controlled by a first scanning signal, and the fourth switching transistor is controlled by a second scanning signal.

4. The display device of claim 1, wherein the first, second, and third switching transistors are p-channel electric field effect transistors, and the fourth switching transistor is an n-channel electric field effect transistor.

5. The display device of claim 4, wherein the second and third switching transistor are controlled by a first scanning signal, and the first and fourth switching transistors are controlled by a second scanning signal.

6. The display device of claim 1, wherein the second, third, and fourth switching transistors are controlled by a first scanning signal and the first switching transistor is controlled by a second scanning signal.

7. The display device of claim 1, wherein the first to fourth switching transistors are controlled by the same scanning signal.

8. The display device of claim 1, wherein the driving transistor is a p-channel electric field effect transistor.

9. The display device of claim 1, wherein an input terminal of the fourth switching transistor receives the sustain voltage.

10. A display device comprising:

a light-emitting element;

a first capacitor that is connected between first and second contact points;

a driving transistor that has a control terminal connected to the second contact point, an input terminal connected to a driving voltage, and an output terminal connected to the light-emitting element;

a first switching transistor connected between a data voltage and the first contact point;

a second switching transistor connected between the second contact point and the output terminal of the driving transistor;

a third switching transistor connected between a reference current source and the output terminal of the driving transistor, wherein one of source and drain electrodes of the third switching transistor is electrically connected to one of source and drain electrodes of the driving transistor; and a fourth switching transistor connected between the first contact point and a sustain voltage, wherein control terminals of the first and fourth switching transistors are commonly connected to one another, and the first and fourth switching transistors are complementary transistors such that the first and fourth switching transistors are transistors of opposite conductivity types, wherein the driving voltage is different from the sustain voltage.

11. The display device of claim 10, wherein the data voltage transitions from a low level to a high level and the sustain voltage constantly has the low level.

* * * * *